(12) United States Patent
Lopez Llorca et al.

(10) Patent No.: US 9,927,176 B2
(45) Date of Patent: Mar. 27, 2018

(54) FURNACE FOR MELTING INORGANIC SALTS

(75) Inventors: Herminio Lopez Llorca, Bilbao (ES); Alejandro Lopez Fanarraga, Bilbao (ES)

(73) Assignee: HERLOGAS, S.A., Bilbao (Bizkaia) (ES)

( * ) Notice: Subject to any disclaimer, the term of this patent is extended or adjusted under 35 U.S.C. 154(b) by 518 days.

(21) Appl. No.: 13/634,436

(22) PCT Filed: Mar. 21, 2011

(86) PCT No.: PCT/ES2011/000084
§ 371 (c)(1),
(2), (4) Date: Nov. 21, 2012

(87) PCT Pub. No.: WO2011/117438
PCT Pub. Date: Sep. 29, 2011

(65) Prior Publication Data
US 2013/0065190 A1 Mar. 14, 2013

(30) Foreign Application Priority Data
Mar. 24, 2010 (ES) .................... 201000389

(51) Int. Cl.
*F27D 7/02* (2006.01)
*F27B 17/00* (2006.01)
(Continued)

(52) U.S. Cl.
CPC ............ *F27D 7/02* (2013.01); *F27B 17/0016* (2013.01); *F27D 19/00* (2013.01); *F27D 21/04* (2013.01);
(Continued)

(58) Field of Classification Search
CPC ..... F28D 2021/0057; F28D 2020/0047; F28D 20/021; F27B 14/10; F27B 14/14;
(Continued)

(56) References Cited

U.S. PATENT DOCUMENTS 1,912,288 A   5/1933  Lundt et al.
2,137,693 A  11/1938  Lundt et al.
(Continued)

FOREIGN PATENT DOCUMENTS

DE   2427548 A1   12/1975
FR   2523286      9/1983
(Continued)

OTHER PUBLICATIONS

International Search Report issued in corresponding International Appl. No. PCT/ES2011/000084, dated Nov. 28, 2011.

*Primary Examiner* — Alissa Tompkins
*Assistant Examiner* — Benjamin W Johnson
(74) *Attorney, Agent, or Firm* — Browdy and Neimark, PLLC

(57) ABSTRACT

Furnace for melting inorganic salts, comprising a container, at least one inlet area for solid inorganic salts, at least one outlet area for molten inorganic salts and at least one heat exchanger tube or coil. Each heat exchanger tube includes an inlet section connected to the outer side wall of the container, a spiral section substantially along the inner side walls of the container defining an internal space, with this spiral section arranged in a substantially horizontal plane, and an outlet section which is substantially vertical and goes downwards towards the bottom area or upwards towards the top area of the container. This furnace provides better safety and performance than previously known furnaces.

9 Claims, 6 Drawing Sheets

(51) Int. Cl.
  *F27D 19/00* (2006.01)
  *F27D 21/04* (2006.01)
  *F28D 7/04* (2006.01)
  *F28D 20/00* (2006.01)
  *F28D 20/02* (2006.01)
  *F28D 21/00* (2006.01)
  *F24H 1/00* (2006.01)

(52) U.S. Cl.
  CPC .............. *F28D 7/04* (2013.01); *F24H 1/0027* (2013.01); *F28D 20/021* (2013.01); *F28D 2020/0047* (2013.01); *F28D 2021/0057* (2013.01); *F28F 2265/10* (2013.01)

(58) Field of Classification Search
  CPC ...... F27B 14/143; F27B 17/0016; C03B 5/00; F24C 15/322; F27D 7/02; F27D 21/04; F27D 19/00; F27D 7/04
  USPC ........................... 432/13, 200, 214, 212, 213
  See application file for complete search history.

(56) References Cited

U.S. PATENT DOCUMENTS

| | | | | |
|---|---|---|---|---|
| 2,569,824 | A | * | 10/1951 | Nall ..................... 126/343.5 A |
| 3,573,887 | A | * | 4/1971 | Mod ............................ 65/134.3 |
| 4,042,318 | A | | 8/1977 | Franke et al. |
| 4,403,645 | A | * | 9/1983 | MacCracken ................... 165/10 |
| 4,614,495 | A | * | 9/1986 | Tabuchi ........................ 432/164 |
| 5,423,378 | A | | 6/1995 | Dillenbeck et al. |
| 5,743,728 | A | * | 4/1998 | Cloud et al. .................. 432/151 |
| 2005/0005646 | A1 | | 1/2005 | Leister et al. |
| 2008/0233527 | A1 | * | 9/2008 | Heinrich et al. ................. 432/13 |
| 2008/0289793 | A1 | * | 11/2008 | Geiken et al. .................. 165/10 |

FOREIGN PATENT DOCUMENTS

| | | | |
|---|---|---|---|
| FR | 2817332 | * | 5/2002 |
| GB | 112827 | | 1/1918 |
| GB | 962837 | | 7/1964 |
| GB | 964704 | | 7/1964 |
| GB | 1331618 | | 9/1973 |
| WO | 9514894 | A1 | 11/1994 |
| WO | 9707073 | A1 | 2/1997 |

* cited by examiner

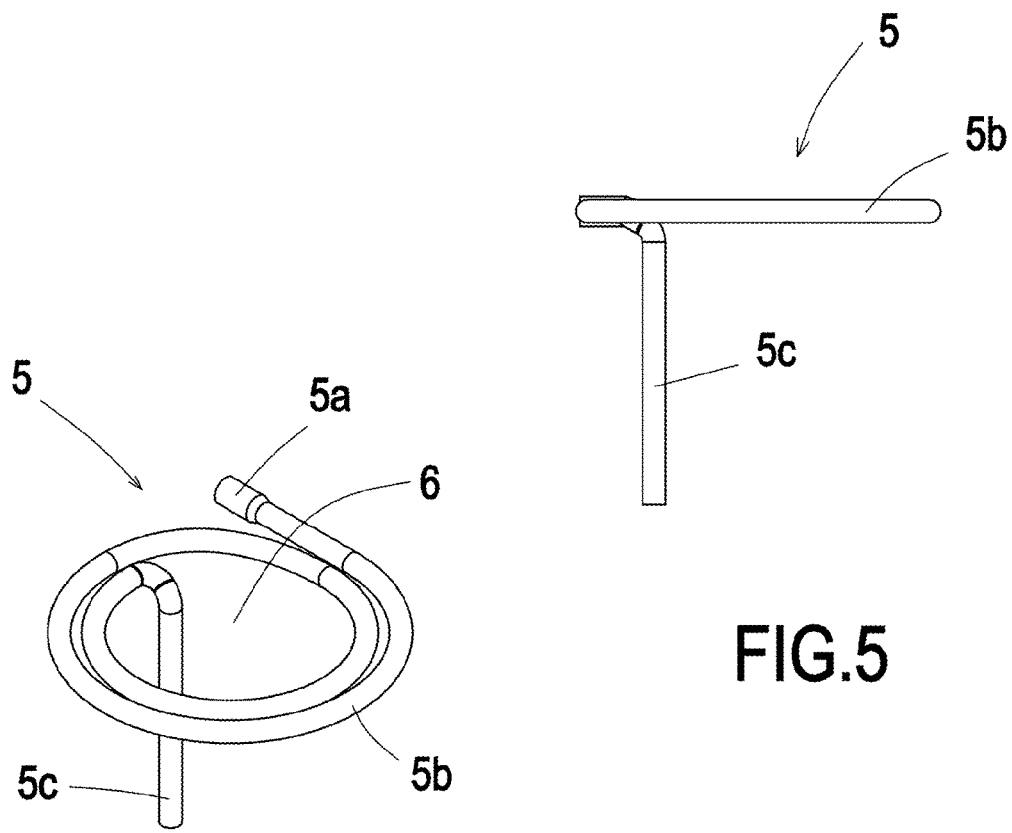
FIG.5
FIG.4
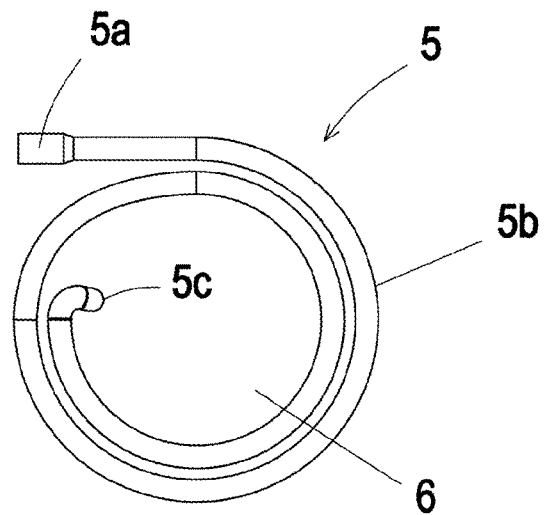
FIG.6

FURNACE FOR MELTING INORGANIC SALTS

TECHNICAL FIELD

The invention relates to a furnace for melting inorganic salts.

Prior Art

Several types of furnaces for melting inorganic salts are known in prior art. All these furnaces are characterized by being formed by a container that is kept warm by means of heating elements, an inlet to feed the furnace with solid inorganic salts, and an outlet (e.g. an overflow) to remove the molten inorganic salts.

The inorganic salts melted by these furnaces can be used for different purposes. The use of molten inorganic salts is known, for instance, as a heat-transfer or heat-storage medium in industrial processes, in heat treatments, in thermal energy storage, in thermosolar plants, etc.

Furnaces for melting inorganic salts typically include some internal means of stirring the inorganic salts during the melting process in order to homogenise the temperature of the salts. Occasionally, there are also physical separation elements between the solid salt inlet and the molten salt outlet, in order to prevent solid salts (with a lower apparent specific gravity) from floating out over the molten salts through the outlet.

One example of a furnace for melting inorganic salts may be seen in document US20050005646, which includes a container with a relatively complex shape and burners that melt the upper area of the salts contained inside it. A recirculation unit stirs the salts to facilitate their homogenisation and removal through an outlet area.

Another example of a furnace for melting salts is described in U.S. Pat. No. 4,042,318. In this furnace, the container is divided into a large number of compartments. Once the solid salts fed through the inlet have been melted, they must travel though all the compartments before exiting though an overflow.

Another example of a furnace for melting inorganic salts may be found in the document US20080233527A1. This furnace includes a substantially vertically arranged container, some heat exchanger tubes, with the flame from burners circulating inside them, a solid salt inlet area and a unit for removing molten salts. Additionally, the furnace includes a circulation unit that creates a flow of molten salts inside the container. The document states that this flow creates two areas, one for solid salts and another for molten salts, with this supposed second area being the one from which the removal unit extracts the molten salts. The heat exchanger tubes of the furnace in question are close to the container walls, and are in the shape of a vertically ascendant and descendant coil, with gas discharge at its highest part. The gas discharge leads gasses into a collector or manifold at the top of the furnace.

The use of vertical heat exchanger tubes has two major risks.

On the one hand, these vertical heat exchanger tubes may overheat due to a lack of salt level in the furnace. Therefore, in order to avoid deterioration of the tubes, heating of this type of furnaces must always be carried out with the furnace completely full of salts. However, in practice it is extremely difficult to create a molten bed with vertical heat exchanger tubes, since the volume of the salts when molten is reduced by approximately 50%, leaving the heat exchanger tubes constantly exposed.

On another hand, it must be taken into account that the heating of salts creates gases and vapours. If the furnace, while in production and therefore full of salts, should suffer an unscheduled stop (due to either breakdown or power failure or lack of fuel) and therefore be left without any heating, the molten salts would cool and start to solidify at the top or on the surface, because this is the area with most heat loss and most connected with the outside. In these circumstances, restarting heating would mean a serious risk, involving danger of explosion, since solidified salts on the surface would prevent the exit of the gases generated by salt reheating, forming a plug or blockage. The vertical heat exchanger tubes do not allow the salts at the top to be melted, without heating the rest, so as to eliminate the risk of explosion.

It is an objective of the present invention to provide a furnace for melting inorganic salts that eliminates the aforementioned risks, thereby improving safety. Additionally, the furnace according to the invention seeks to increase its yield, as well as to improve labour conditions for workers.

BRIEF DESCRIPTION OF THE INVENTION

The object of the invention is a furnace for melting inorganic salts, which comprises a container, at least one inlet area for solid inorganic salts and at least one outlet area for molten inorganic salts. The furnace according to the invention comprises at least one heat exchanger tube (also known as "coil") characterised in that it is provided with an inlet area connected to the outer side wall of the container, a substantially spiral body along the inner walls of the container, defining an interior space and a substantially vertical outlet section directed downwards towards the bottom area or upwards towards the top area of the container. The spiral body of the heat exchanger tube is arranged on a substantially horizontal plane. Connected to the inlet area of the heat exchanger tube, although outside the container, is a burner, which is not relevant for the present invention.

In a particularly advantageous manner, the furnace includes several heat exchanger tubes of the type described, installed at different heights and defining different heating levels. This enables that, when the furnace is being started (during its initial filling), the solid salts can be heated in ascending height order, starting by heating the lowest situated heat exchanger tube until reaching the highest. This will eliminate the risk of explosion in the furnace, as the gases created may be freely evacuated because they do not have a solid salt layer on top of them. On another hand, if the furnace is in full production of molten salts and goes cold, heating of salts takes place in the opposite direction: heating starts with the highest situated heat exchanger tube and then, once the salts at its level have been melted, continues in descending order with the second tube and so on until heating the last tube at the bottom. In this way, the risk of explosion is avoided because there are no solid salts above the area being heated, so that gases generated during heating are allowed to be evacuated through the molten salts by bubbling and then discarded through a gas outlet.

BRIEF DESCRIPTION OF THE DRAWINGS

Details of the invention can be seen in the accompanying drawings, which do not seek to restrict the scope of the invention:

FIG. 4 shows a perspective view of a heat exchanger tube according to the invention.

FIG. 5 shows an elevation view of the heat exchanger tube in FIG. 4.

FIG. 6 shows a plan view of the heat exchanger tube in FIG. 4.

DETAILED DESCRIPTION OF THE INVENTION

Figure 1:
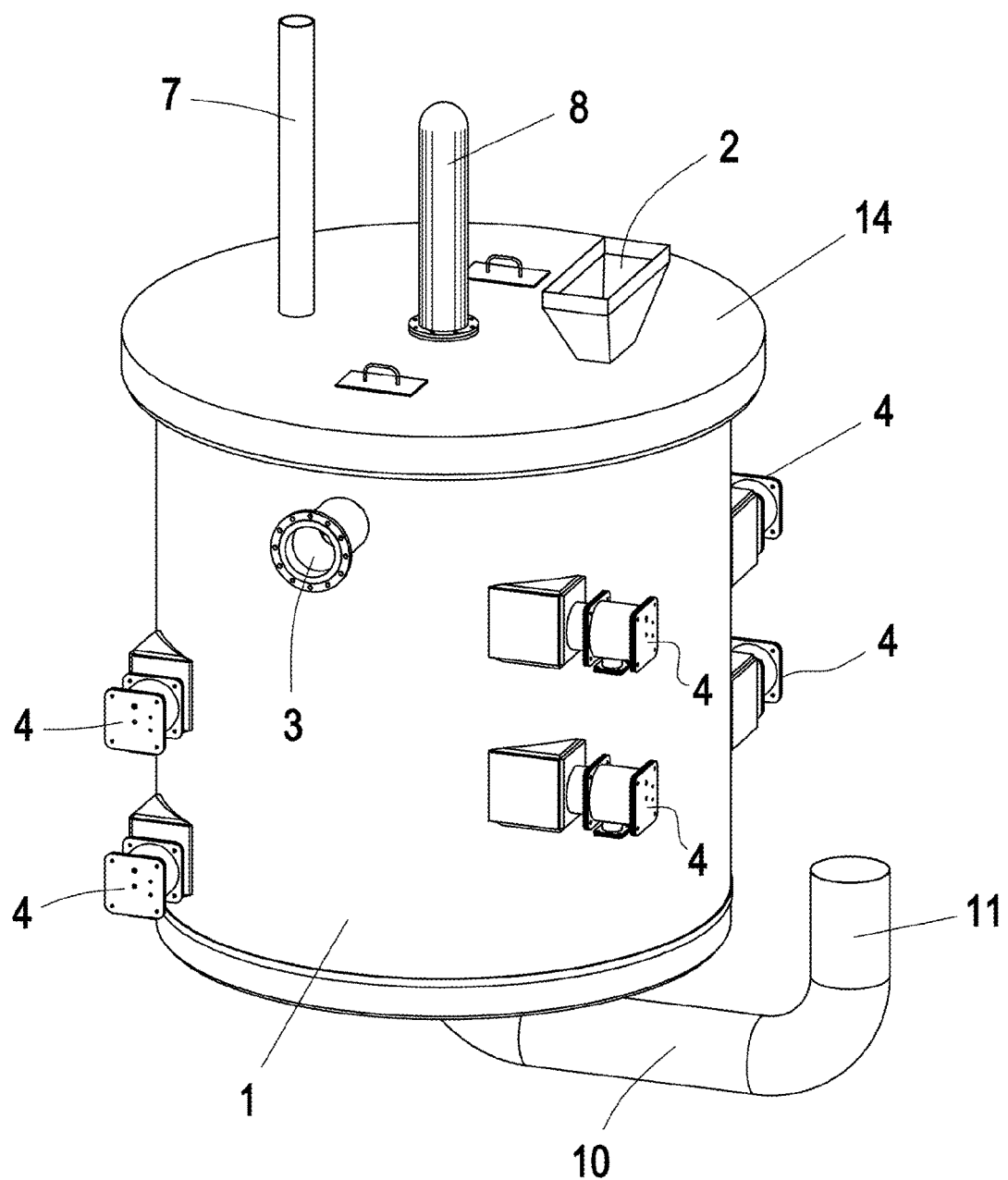
FIG. 1 shows a perspective view of the preferred embodiment of the furnace according to the invention.
Figure 2:
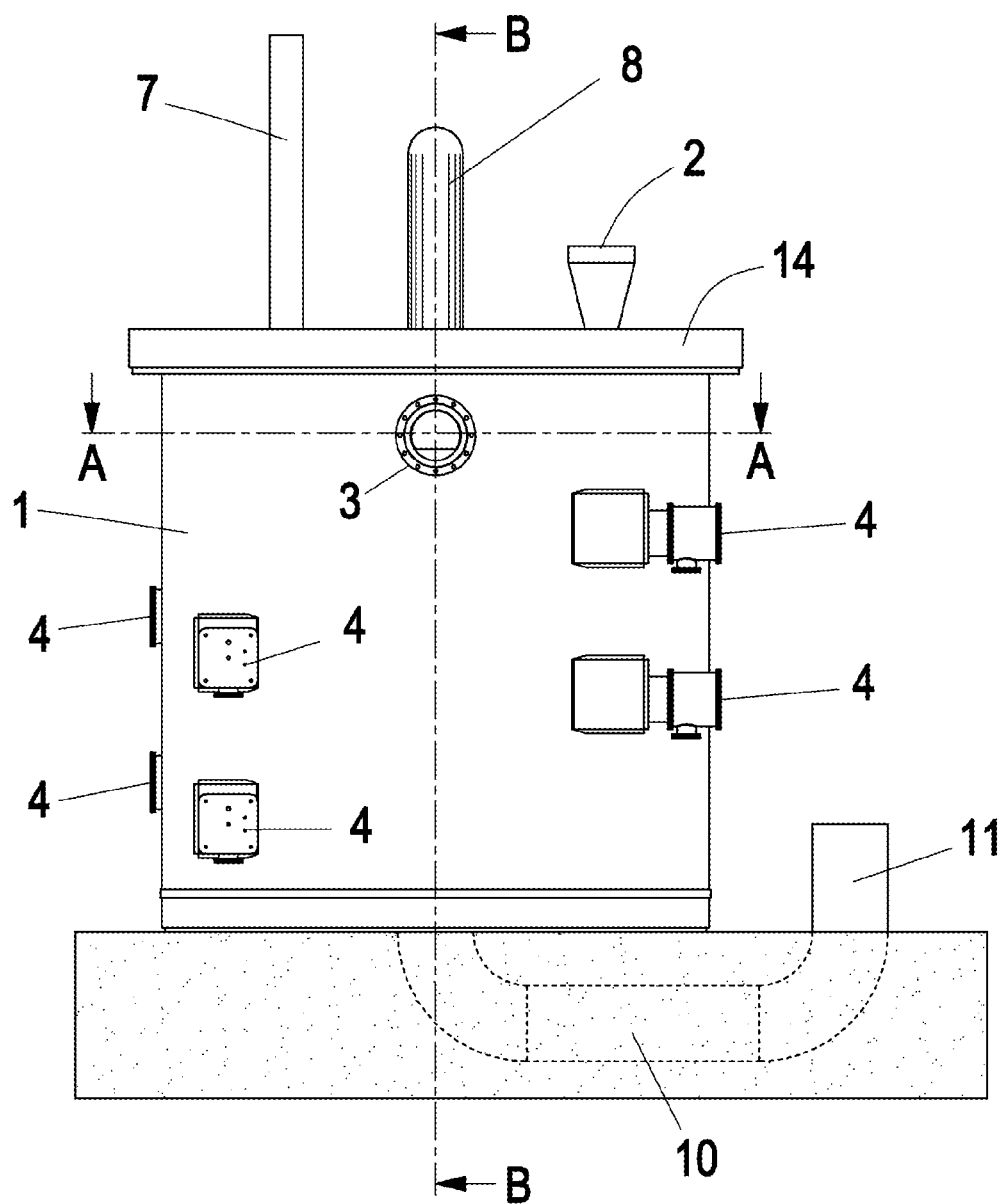
FIG. 2 shows an elevation view of the furnace in FIG. 1.
Figure 3:
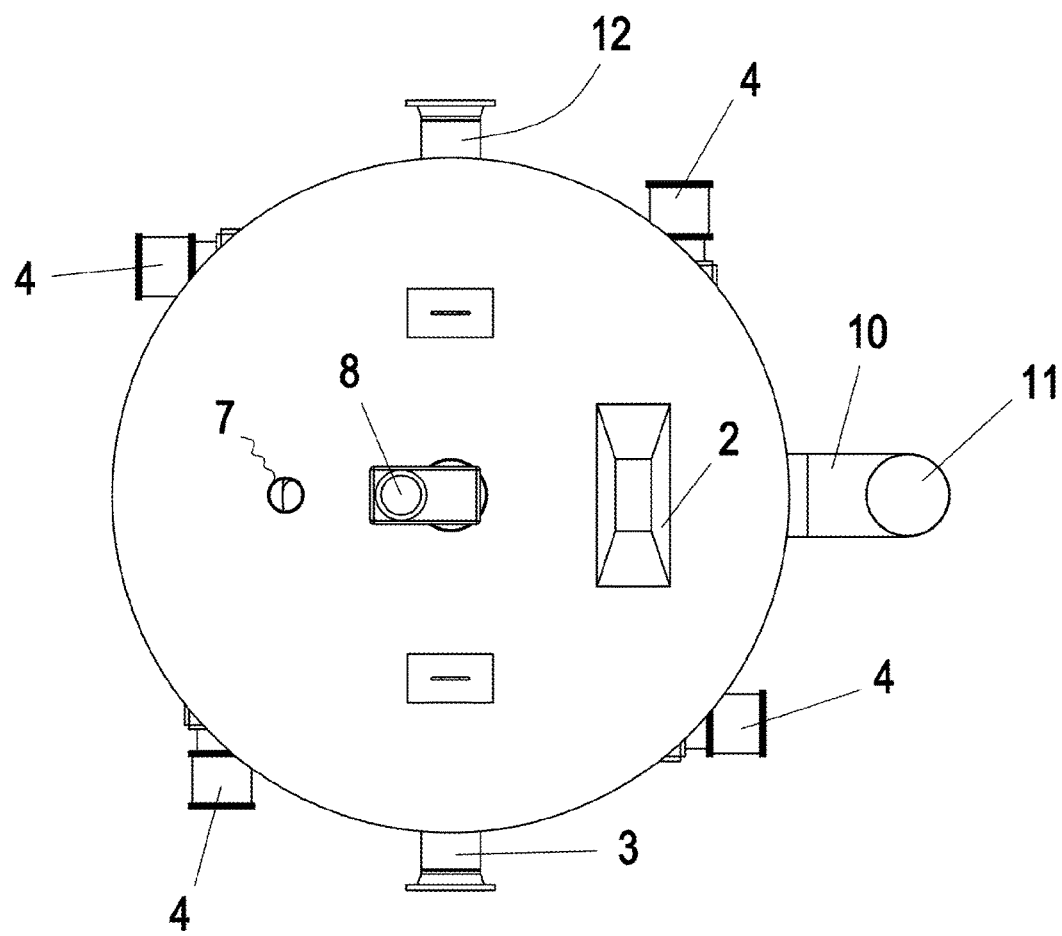
FIG. 3 shows a plan view of the furnace in FIG. 1.

FIG. 1 shows a perspective view of the preferred embodiment of the furnace according to the invention. The furnace includes a container (1), which in the present embodiment is cylindrical in shape. At the top area of the container (1) there is a solid inorganic salt inlet area (2), where crushed and mixed solid inorganic salts are inserted. In addition, the furnace includes a molten inorganic salt outlet area (3), which in the present embodiment takes the form of an overflow. FIGS. 2 and 3, respectively, show an elevation view and a plan view of the furnace of FIG. 1. The furnace includes a series of heat exchanger tubes or internal coils, inside which combustion gases at very high temperature are conveyed, causing heating and melting of the inorganic salts. The heat for the heat exchanger tubes is generated by burners (4) located on the outside of the container, one for each heat exchanger tube (5). These burners are shown in FIGS. 1, 2, 3 and 7.

FIGS. 4 to 6 show three views of one of the heat exchanger tubes (5) according to the invention. Each heat exchanger tube (5) includes an inlet section (5a), a spiral section (5b) and an outlet section (5c). The inlet section (5a) is connected to the outer side wall of the container (1), with the corresponding burner (4) mounted outside. Combustion starts in this inlet section (5a), which acts as a hearth. The spiral section (5b) extends substantially along the inner side walls of the container (1), defining an internal space (6), and is arranged on a substantially horizontal plane. The spiral shape is very important as it allows for dilatation in all directions, preventing the heat exchanger tube (5) from supporting mechanical stress and strain as a result of such dilatation, thereby increasing the life of the heat exchanger tubes (5) due to the absence of mechanical fatigue. The outlet section (5c), in the present embodiment, descends substantially vertically towards the bottom of the container (1), in this case reaching said bottom.

It should be noted that in other embodiments the outlet section (5c) may be directed towards the top area of the container (1) (for example towards a lid (14) which covers it). In addition, the outlet section (5c) preferably reaches the bottom or top area of the container (1), although other alternatives are also contemplated.

Figure 7:
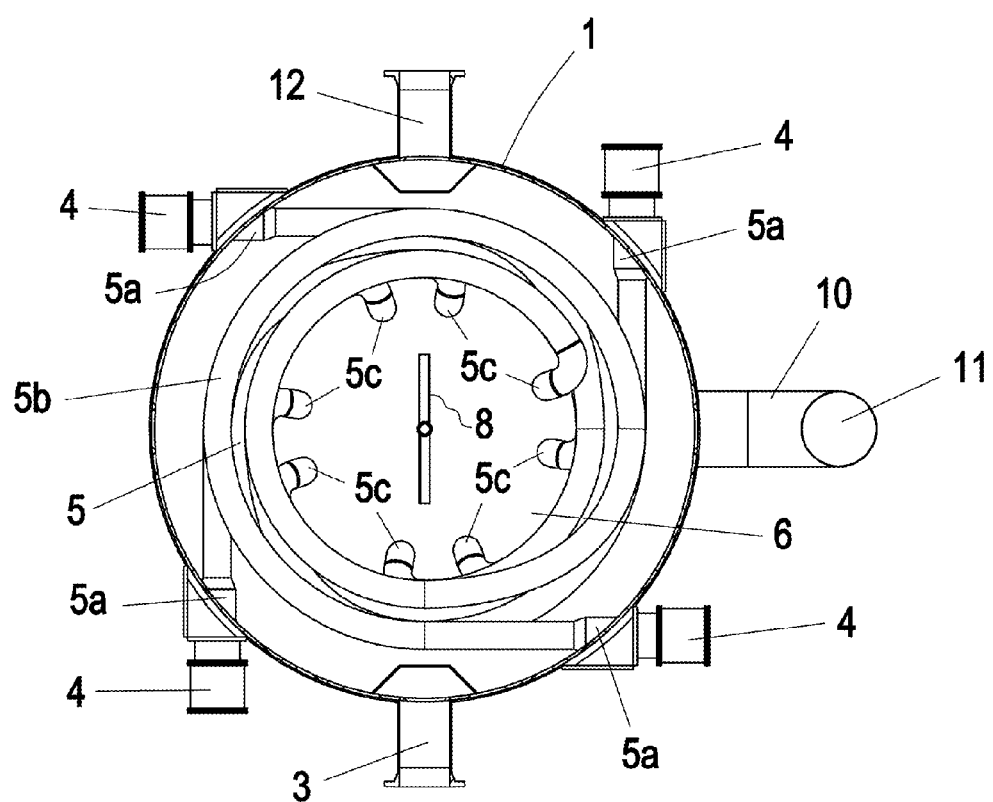
FIG. 7 shows a cross-section view of the furnace according to the section plane A-A in FIG. 2.
Figure 8:
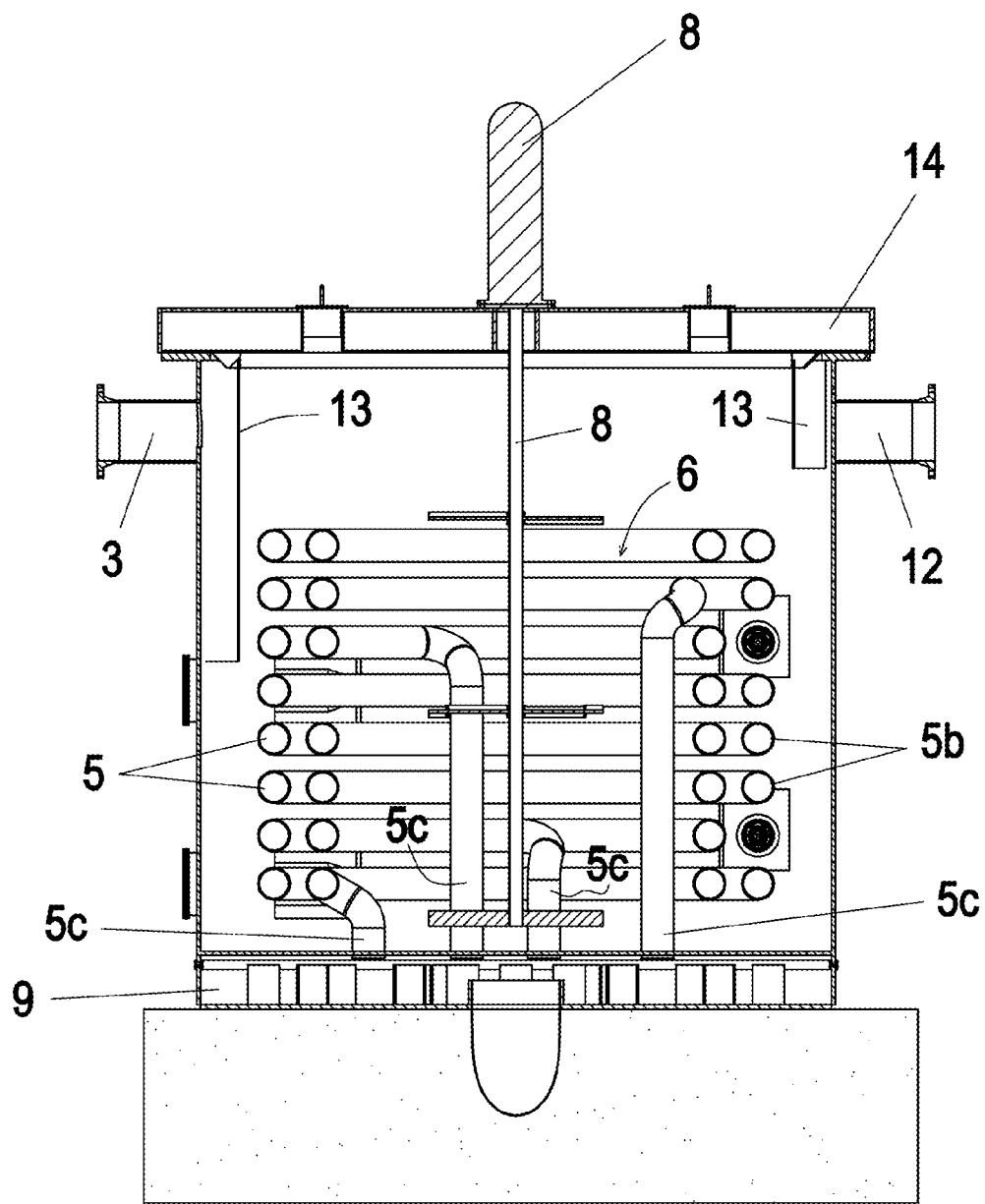
FIG. 8 shows a cross-section view of the furnace according to the section plane B-B in FIG. 2.

In a particularly advantageous manner, as shown in FIGS. 7 and 8, the furnace includes several heat exchanger tubes (5), in this case a total of eight, arranged at different heights which define different levels of heating for the container (1). This enables the salts to be melted by levels, when heating starts, thereby notably improving safety. Each level may or may not have an independent temperature control system.

The start-up procedure is as follows:

Firstly, solid salts are fed into the container (1) until they cover the first heating level (associated to the lowest heat exchanger tube (5)). The corresponding burner (4) is ignited, causing the heat exchanger tube to become heated and melt the salts which are in contact with it, until a bed of molten salts is formed at the bottom of the container (1). This heating process is not achievable in a furnace with vertical heat exchanger tubes, since the greater part of these remain in the air, out of contact with the salts, with the consequent risk of overheating.

Further solid salts are then added until the second heating level of the contained (1) is reached, corresponding to the second heat exchanger tube (5), in ascending order. Once the corresponding burner (4) is ignited, melting of this second level of salts takes place.

This process is repeated for the successive heating levels in the container (1). Once that all the burners (4) have been ignited and the temperature required to melt and pump the salts has been reached (approximately 150° C. higher that their melting point), more salt is added up to the level of the outlet area (3). This is when the furnace is able to supply molten salts; from this moment onwards, the addition of new solid salts causes the molten salts to overflow through the outlet area (3), to a post-melting tank not shown in the figures.

At all times, the gases and fumes generated by melting the salts are expelled through an outlet (7) intended for that purpose and located on the top area of the container (1). This outlet (7) is shown in FIGS. 1 and 2.

When the furnace is in the conditions described, a stirrer system (e.g. a mechanical or induction system, a mechanical rotary stirrer (8) being shown in the present embodiment) is put into operation in order to achieve uniform temperatures in all levels of the container (1) and increase the heat transfer between the heat exchanger tubes (5) and the molten salts. The stirrer system preferably causes the rotation of the molten salts in a countercurrent direction, i.e. opposite to the rotation direction of the combustion gases inside the spiral section (5b) of the heat exchanger tubes (5). This enables the performance and heat transmission of the heat exchanger tubes (5) to be increased, thereby achieving greater production of molten salts with lower energy consumption.

With the furnace in these conditions, if solid salts are fed on top of the molten salts, solid salts instantaneously melt and are dragged downwards by the rotation of the descending vertical cyclone generated by the stirrer system and directed to the bottom of the container (1). After, the molten salts return to the surface, around the perimeter, with upward rotation between the radiant heat exchanger tubes (5), which overheat them again to the temperatures preset by the control and safety systems for each area, if these are installed. This overheating allows the new solid salts which are continually added at the top to be melted.

The furnace according to the invention preferably includes a gas collector cavity (9) located at the bottom or top area of the container (1), depending on where the outlet sections (5c) of the heat exchanger tubes (5) evacuate. The outlet sections (5c) of each heat exchanger tube (5) expel or evacuate their combustion gases into this cavity (9).

The figure show a cavity (9) located at the bottom of the container (1). In this case, the cavity (9) applies the residual heat from combustion to the container (1). Additionally, as shown in the figure, the cavity (9) preferably communicates with an underground lower duct (10), which is used as an outlet for the combustion gases, as shown in FIGS. 1 and 2. This lower duct (10) continues as a chimney (11) separated from the furnace. Separating the chimney from the work area improves security and working conditions for furnace operators.

If the cavity (9) is located at the top area of the container (1), the gas can similarly be extracted from the cavity (9) to the outside through a duct that ends in a chimney.

FIG. 8 shows that the furnace can also include at least one safety overflow (12), which is used in case of supplementary requirement. An internal dividing element (13) may also be included in order to separate the solid salts which are fed in through the inlet area (2) and float on top of the molten salts, thereby preventing the egress of solid salts through the outlet area (3) and absorbing the possible level differences caused by the stirrer system.

Preferably, the heat exchanger tubes (5), the container (1) (including a lid (14) that covers it) and/or the gas collector cavity (9) are made partly of stainless steel and partly of carbon steel.

The invention claimed is:

1. A furnace for melting inorganic salts, comprising:
 a container having a top and a bottom, comprising an internal cavity delimited by inner side walls of said container;
 at least one inlet area for solid inorganic salts at the top of said container;
 at least one outlet area for molten inorganic salts; and
 several heat exchanger tubes, through which combustion gases circulate, each heat exchanger tube comprising:
 a respective inlet section connected to an outer side wall of the container and in fluid communication with a respective burner;
 a respective spiral section extending from said inlet section and substantially disposed along the inner side walls of the container, the spiral section arranged on a substantially horizontal plane, said spiral section extending in a coil configuration having a decreasing diameter and defining an internal space of the spiral section; and
 a respective substantially vertical outlet section extending from said spiral section to a gas collector cavity located at the bottom of the container,
 wherein said gas collector cavity is positioned below and partitioned from said internal cavity and into which gases from said substantially vertical outlet section of each heat exchanger tube are evacuated;
 wherein the burners of the heat exchanger tubes are individually ignitable, and the respective spiral sections of the heat exchanger tubes are arranged at different heights defining different heating levels for the container, and
 wherein the respective internal spaces of the spiral sections are arranged in vertical registration relative to one another.

2. The furnace of claim 1, wherein the outlet area comprises an overflow.

3. The furnace of claim 1, wherein the gases are extracted from said gas collector cavity to the exterior through an underground lower duct, which finishes in a chimney that is separated from the furnace.

4. The furnace of claim 1, wherein the heat exchanger tubes, the container, a lid that covers the container and/or the gas collector cavity are made partly of stainless steel and partly of carbon steel.

5. The furnace of claim 1, further comprising a stirrer system to homogenise the molten salts.

6. The furnace of claim 5, wherein the stirrer system turns the molten salts in the opposite direction to the flow of the combustion gases inside the spiral section of the heat exchanger tube.

7. The furnace of claim 1, further comprising at least one internal dividing element between the inlet area and the outlet area.

8. The furnace of claim 1, further comprising a safety overflow.

9. The furnace of claim 1, further comprising an outlet intended to evacuate the gases and vapours generated by melting the salts.

* * * * *